US012442847B2

United States Patent
Ma et al.

(10) Patent No.: US 12,442,847 B2
(45) Date of Patent: Oct. 14, 2025

(54) METHOD FOR PARAMETER EXTRACTION OF SENSITIVE PROBE AND DEGREE-OF-FREEDOM COUPLING CALCULATION OF CAPACITIVE DISPLACEMENT SENSOR

(71) Applicant: HUAZHONG UNIVERSITY OF SCIENCE AND TECHNOLOGY, Hubei (CN)

(72) Inventors: Hong Ma, Hubei (CN); Hong Yang, Hubei (CN); Hua Zhang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 159 days.

(21) Appl. No.: 18/432,045

(22) Filed: Feb. 4, 2024

(65) Prior Publication Data
US 2025/0155482 A1   May 15, 2025

(30) Foreign Application Priority Data

Nov. 9, 2023   (CN) .......................... 202311511198.5

(51) Int. Cl.
*G01R 27/26*   (2006.01)
*G01D 5/241*   (2006.01)
(Continued)

(52) U.S. Cl.
CPC ......... *G01R 27/2605* (2013.01); *G01D 5/241* (2013.01); *G06F 17/16* (2013.01); *G06F 30/367* (2020.01); *G06F 30/398* (2020.01)

(58) Field of Classification Search
CPC ........ G01R 27/00; G01R 27/02; G01R 27/26; G01R 27/2605; G01D 5/00; G01D 5/12;
(Continued)

(56) References Cited

U.S. PATENT DOCUMENTS 5,583,443 A * 12/1996 McMurtry ............. G01B 7/008
                                                       324/754.28

FOREIGN PATENT DOCUMENTS

| CN | 103256964 A | * | 8/2013 | ............ G01F 23/26 |
| CN | 110823316 A | * | 2/2020 | ........... G01F 23/263 |

(Continued)

*Primary Examiner* — Hoai-An D. Nguyen
(74) *Attorney, Agent, or Firm* — JCIPRNET

(57) ABSTRACT

A method for parameter extraction of a sensitive probe and degree-of-freedom coupling calculation of a capacitive displacement sensor is provided. Through applying multiple groups of charge excitations to the mechanically sensitive probe with a multi-conductor structure, the electrostatic field distribution inside the sensitive probe under each group of excitation charges is obtained by numerical calculation to compute the electrostatic field energy, thereby finally extracting the complete distributed capacitance matrix of the sensitive probe. For the couplings among the multi-degree-of-freedom displacements caused by the sensitive probe, through establishing an indefinite admittance matrix of the sensitive probe and connecting the subsequent multi-channel sensing circuits, a complete equivalent circuit model for multi-degree-of-freedom coupling analysis is obtained to quantitatively calculated the degree-of-freedom coupling caused by displacement of the test mass.

8 Claims, 4 Drawing Sheets

(51) Int. Cl.
*G06F 17/16* (2006.01)
*G06F 30/367* (2020.01)
*G06F 30/398* (2020.01)

(58) Field of Classification Search
CPC ............ G01D 5/14; G01D 5/24; G01D 5/241;
G06F 30/00; G06F 30/30; G06F 30/36;
G06F 30/367; G06F 30/39; G06F 30/398;
G06F 17/00; G06F 17/10; G06F 17/16
USPC ................................ 324/600, 649, 658, 679
See application file for complete search history.

(56) References Cited

FOREIGN PATENT DOCUMENTS

| | | | | | |
|---|---|---|---|---|---|
| CN | 115856396 | A | * | 3/2023 | ............. G01R 19/00 |
| CN | 115219762 | B | * | 8/2023 | ......... G01R 19/0084 |
| JP | 2012140560 | A | * | 7/2012 | ............. C08G 73/10 |

* cited by examiner

FIG. 3

METHOD FOR PARAMETER EXTRACTION OF SENSITIVE PROBE AND DEGREE-OF-FREEDOM COUPLING CALCULATION OF CAPACITIVE DISPLACEMENT SENSOR

CROSS-REFERENCE TO RELATED APPLICATION

This application claims the priority benefit of China application serial no. 202311511198.5, filed on Nov. 9, 2023. The entirety of the above-mentioned patent application is hereby incorporated by reference herein and made a part of this specification.

BACKGROUND

Technical Field

The disclosure belongs to the technical field of signal analysis and detection, and more specifically relates to a method for parameter extraction of a sensitive probe and degree-of-freedom coupling calculation of a capacitive displacement sensor.

Description of Related Art

Signal analysis and detection technology is widely applied in fields such as aerospace, communication, and space gravitational wave detection, and is one of the important research topics in fields such as communication and aerospace equipment design.

As one of the key parts of a space gravitational wave detection apparatus, the inertial sensor provides an inertial reference for laser interference ranging. As shown in FIG. 1, the sensitive probe consists of a centrally located test mass (TM), dozen surrounding injection and sensing electrodes, and an outer metal frame which not being drawn in the figure to facilitate showing the connection structure of the sensitive probe and the capacitive displacement sensing circuits. The TM is the core of the sensitive probe. The whole inertial sensor keeps the TM freely suspending in the center of the sensitive probe to avoid vibration caused by the satellite platform and the space environment. Displacement variation of the TM results in the variation of the distributed capacitances among the TM and the sensing electrodes of the sensitive probe.

The capacitive displacement sensing circuit is one of critical components of the inertial sensor, which is used to detect the displacement variation of the TM by measuring the variation of the distributed capacitances among the internal TM and the sensing electrodes. Accurate calculating and extraction the values of the distributed capacitance vitally helps to obtain the relationships among the TM displacements and the distributed capacitances. Because of the complicated distributed capacitance coupling connection in the sensitive probe, the TM displaces along a certain direction could cause non-zero displacement sensing outputs along other degrees of freedom of displacement, which is called the output displacement degree-of-freedom couplings. How to analyze and calculate the degree-of-freedom coupling is very important and technically difficult.

The electrostatic coupling to the sensitive axis direction displacement (that is, an X axis) caused by the non-sensitive axes directions displacement (that is, Y- and Z-axes directions displacement) has been studied from the perspective of physical mechanics.

The distributed capacitances of the mechanically sensitive probe in the inertial sensor is firstly extracted in the disclosure from the perspectives of three-dimensional electromagnetic field numerical calculation, and then the output signals of the multi-channel capacitive displacement sensing circuits is analyzed and computed by means of the equivalent integrated parameter circuit model of the sensitive probe, thereby the couplings among the multi-degree-of-freedom displacements are finally obtained.

SUMMARY

In view of the distributed capacitance extraction of a mechanically sensitive probe in the capacitive displacement sensor and the couplings among the multi-degree-of-freedom displacements caused by the sensitive probe, a method for parameter extraction of a sensitive probe and degree-of-freedom coupling calculation of a capacitive displacement sensor is firstly provided.

Through applying multiple groups of charge excitations to a sensitive probe with a multi-conductor structure, the electrostatic field distribution inside the sensitive probe under each group of excitation charges is obtained by numerical calculation to compute the electrostatic field energy, thereby a complete distributed capacitance matrix is finally extracted.

Through establishing the indefinite admittance matrix of the sensitive probe and connecting the subsequent multi-channel sensing circuits, a complete equivalent circuit model for multi-degree-of-freedom coupling analysis is obtained to quantitatively compute the couplings among the multi-degree-of-freedom displacements caused by displacement of the TM.

Therefore, a method for parameter extraction of a sensitive probe and degree-of-freedom coupling calculation of a capacitive displacement sensor is firstly provided, including the following steps.

In Step 1, translational or rotational displacement with different directions is performed on the TM, $N(N+1)/2$ groups of excitation charges are set, and then the three-dimensional electrostatic field distribution under each group of excitation charges is obtained to calculate the electrostatic field energy, thereby a full capacitance matrix for different translational or rotational displacements is finally extracted, where N is the number of conductors in the sensitive probe.

In Step 2, capacitances among the conductors of the sensitive probe can be obtained based on the full capacitance matrix extracted in Step 1 to calculate the N-port indefinite admittance matrix $Y_{N \times N}$ of the sensitive probe.

In Step 3, based on the full capacitance matrix extracted in Step 1, an equivalent circuit model is established in combination with the specific connection of the sensitive probe to each capacitive displacement sensing channel, an equation $I=YV$ satisfied by the voltages and the currents of the N nodes is directly written from the indefinite admittance matrix, and then the V–I characteristics satisfied by external termination components of the N nodes are substituted into the above equation to obtain the voltage and the current at each node, thereby the output complex voltage of each capacitive displacement sensing channel is finally obtained.

In Step 4, based on the full capacitance matrix for different translational or rotational displacements extracted in Step 1, the variation value sequence of each distributed capacitance with displacement is interpolated and fitted to obtain a continuous variation curve of each distributed capacitance versus displacement.

In Step 5, a time-varying manner of displacement of the TM in the sensitive probe can be arbitrarily specified, and a value of each distributed capacitance at each displacement moment can be obtained according to the variation curve of each distributed capacitance versus displacement obtained in Step 4, which is then applied to calculate the output complex voltage of each capacitive displacement sensing channel in Step 3.

In Step 6, the time sequence of the output complex voltage of each capacitive displacement sensing channel is combined with displacement degrees of freedom, and then the Fourier transform is performed to obtain the spectrum of the output signal of each displacement degree of freedom, thereby the couplings among multi-degree-of-freedom displacements caused by the sensitive probe are finally calculated.

Further, in Step 1, $Q^{(k)}$ is the k-th group of excitation charges applied to N conductors of the sensitive probe:

$$Q^{(k)} = (q_1^{(k)}, q_2^{(k)}, \ldots, q_n^{(k)}, \ldots q_N^{(k)}), k = 1, 2, \ldots, N, N+1, \ldots, \frac{N(N+1)}{2}$$

where $q_n^{(k)}$ is the charge quantity on the n-th conductor in the k-th group of excitation charges $Q^{(k)}$, the value thereof can be $-1$ Coulomb, $+1$ Coulomb, or zero Coulomb, and must satisfy $\Sigma_{n=1}^{N}|q_n^{(k)}|=1$, or satisfy $\Sigma_{n=1}^{N}q_n^{(k)}=0$, $\Sigma_{n=1}^{N}|q_n^{(k)}|=2$, and must satisfy the requirement that excitation charges of different groups are not the same.

Further, in Step 1, the three-dimensional electrostatic field distribution $E^{(k)}$ of the medium region inside the sensitive probe under the k-th group of excitation charges $Q^{(k)}$ is computed by numerical calculation such as the finite difference method, and then $\alpha_{ij}$ is deduced from the following equation, wherein $\alpha_{ij}$ is the matrix element in the i-th row and j-th column of an N×N symmetric matrix $\alpha$, where i, j=1, 2, ..., N:

$$\begin{pmatrix} \alpha_{11} \\ \vdots \\ \alpha_{NN} \\ \alpha_{12} \\ \vdots \\ \alpha_{1N} \\ \alpha_{23} \\ \vdots \\ \alpha_{2N} \\ \alpha_{34} \\ \vdots \\ \alpha_{N-1,N} \end{pmatrix} =$$

$$\begin{pmatrix} \frac{1}{2}(q_1^{(1)})^2 & \cdots & \frac{1}{2}(q_N^{(1)})^2 & q_1^{(1)}q_2^{(1)} & \cdots & q_1^{(1)}q_N^{(1)} & q_2^{(1)}q_3^{(1)} & \cdots & q_2^{(1)}q_N^{(1)} & q_3^{(1)}q_4^{(1)} & \cdots & q_{N-1}^{(1)}q_N^{(1)} \\ \vdots & \ddots & \vdots & \vdots & \ddots & \vdots & \vdots & \ddots & \vdots & \vdots & \ddots & \vdots \\ \frac{1}{2}(q_1^{(N)})^2 & \cdots & \frac{1}{2}(q_N^{(N)})^2 & q_1^{(N)}q_2^{(N)} & \cdots & q_1^{(N)}q_N^{(N)} & q_2^{(N)}q_3^{(N)} & \cdots & q_2^{(N)}q_N^{(N)} & q_3^{(N)}q_4^{(N)} & \cdots & q_{N-1}^{(N)}q_N^{(N)} \\ \frac{1}{2}(q_1^{(N+1)})^2 & \cdots & \frac{1}{2}(q_N^{(N+1)})^2 & q_1^{(N+1)}q_2^{(N+1)} & \cdots & q_1^{(N+1)}q_N^{(N+1)} & q_2^{(N+1)}q_3^{(N+1)} & \cdots & q_2^{(N+1)}q_N^{(N+1)} & q_3^{(N+1)}q_4^{(N+1)} & \cdots & q_{N-1}^{(N+1)}q_N^{(N+1)} \\ \vdots & \ddots & \vdots & \vdots & \ddots & \vdots & \vdots & \ddots & \vdots & \vdots & \ddots & \vdots \\ \frac{1}{2}(q_1^{(2N-1)})^2 & \cdots & \frac{1}{2}(q_N^{(2N-1)})^2 & q_1^{(2N-1)}q_2^{(2N-1)} & \cdots & q_1^{(2N-1)}q_N^{(2N-1)} & q_2^{(2N-1)}q_3^{(2N-1)} & \cdots & q_2^{(2N-1)}q_N^{(2N-1)} & q_3^{(2N-1)}q_4^{(2N-1)} & \cdots & q_{N-1}^{(2N-1)}q_N^{(2N-1)} \\ \frac{1}{2}(q_1^{(2N)})^2 & \cdots & \frac{1}{2}(q_N^{(2N)})^2 & q_1^{(2N)}q_2^{(2N)} & \cdots & q_1^{(2N)}q_N^{(2N)} & q_2^{(2N)}q_3^{(2N)} & \cdots & q_2^{(2N)}q_N^{(2N)} & q_3^{(2N)}q_4^{(2N)} & \cdots & q_{N-1}^{(2N)}q_N^{(2N)} \\ \vdots & \ddots & \vdots & \vdots & \ddots & \vdots & \vdots & \ddots & \vdots & \vdots & \ddots & \vdots \\ \frac{1}{2}(q_1^{(3N-3)})^2 & \cdots & \frac{1}{2}(q_N^{(3N-3)})^2 & q_1^{(3N-3)}q_2^{(3N-3)} & \cdots & q_1^{(3N-3)}q_N^{(3N-3)} & q_2^{(3N-3)}q_3^{(3N-3)} & \cdots & q_2^{(3N-3)}q_N^{(3N-3)} & q_3^{(3N-3)}q_4^{(3N-3)} & \cdots & q_{N-1}^{(3N-3)}q_N^{(3N-3)} \\ \frac{1}{2}(q_1^{(3N-2)})^2 & \cdots & \frac{1}{2}(q_N^{(3N-2)})^2 & q_1^{(3N-2)}q_2^{(3N-2)} & \cdots & q_1^{(3N-2)}q_N^{(3N-2)} & q_2^{(3N-2)}q_3^{(3N-2)} & \cdots & q_2^{(3N-2)}q_N^{(3N-2)} & q_3^{(3N-2)}q_4^{(3N-2)} & \cdots & q_{N-1}^{(3N-2)}q_N^{(3N-2)} \\ \vdots & \ddots & \vdots & \vdots & \ddots & \vdots & \vdots & \ddots & \vdots & \vdots & \ddots & \vdots \\ \frac{1}{2}\left(q_1^{\left(\frac{N(N+1)}{2}\right)}\right)^2 & \cdots & \frac{1}{2}\left(q_N^{\left(\frac{N(N+1)}{2}\right)}\right)^2 & q_1^{\left(\frac{N(N+1)}{2}\right)} & \cdots & q_1^{\left(\frac{N(N+1)}{2}\right)} & q_2^{\left(\frac{N(N+1)}{2}\right)} & \cdots & q_2^{\left(\frac{N(N+1)}{2}\right)} & q_3^{\left(\frac{N(N+1)}{2}\right)} & \cdots & q_{N-1}^{\left(\frac{N(N+1)}{2}\right)} \\ & & & q_2^{\left(\frac{N(N+1)}{2}\right)} & & q_N^{\left(\frac{N(N+1)}{2}\right)} & q_3^{\left(\frac{N(N+1)}{2}\right)} & & q_N^{\left(\frac{N(N+1)}{2}\right)} & q_4^{\left(\frac{N(N+1)}{2}\right)} & & q_N^{\left(\frac{N(N+1)}{2}\right)} \end{pmatrix}^{-1}$$

-continued $$\begin{Bmatrix} \int_\tau \frac{1}{2}\varepsilon(E^{(1)})^2 d\tau \\ \vdots \\ \int_\tau \frac{1}{2}\varepsilon(E^{(N)})^2 d\tau \\ \int_\tau \frac{1}{2}\varepsilon(E^{(N+1)})^2 d\tau \\ \vdots \\ \int_\tau \frac{1}{2}\varepsilon(E^{(2N-1)})^2 d\tau \\ \int_\tau \frac{1}{2}\varepsilon(E^{(2N)})^2 d\tau \\ \vdots \\ \int_\tau \frac{1}{2}\varepsilon(E^{(3N-3)})^2 d\tau \\ \int_\tau \frac{1}{2}\varepsilon(E^{(3N-2)})^2 d\tau \\ \vdots \\ \int_\tau \frac{1}{2}\varepsilon\left(E^{\frac{N(N+1)}{2}}\right)^2 d\tau \end{Bmatrix}$$

where $\varepsilon$ is the dielectric constant of the filling medium in the sensitive probe and $$\int_\tau \frac{1}{2}\varepsilon(E^{(k)})^2 d\tau$$

is the calculated electrostatic field energy for the spatial region $\tau$ of the electrostatic field distribution $E^{(k)}$. The symmetric matrix $\alpha$ can be constructed by the calculated $\alpha_{ij}$.

Then, the matrix $\beta$ is deduced from the equation $\beta=\alpha^{-1}$ with the matrix element $\beta_{ij}$, where i, j=1, 2, . . . , N.

The distributed mutual capacitance $C_{ij}$ between the i-th conductor and the j-th conductor, and the distributed self-capacitance $C_{ii}$ between the i-th conductor and the outer metal frame (i.e., ground) can be calculated:

$$C_{ij} = -\beta_{ij}, (i \neq j)$$

$$C_{ii} = \sum_{j=1}^{N} \beta_{ij}$$

Thereby, a symmetrical full capacitance matrix $C_{N \times N}$ of the sensitive probe is finally obtained.

Furthermore, in Step 2, an N-port indefinite admittance matrix $Y_{N \times N}$ of the sensitive probe is calculated as follows.

In Step 2-1, the N conductors in the sensitive probe are sequentially node numbered, and the outer metal frame is applied as a common node.

In Step 2-2, the indefinite admittance matrices for distributed capacitances among the conductors of the sensitive probe are calculated according to the extracted full capacitance matrix, wherein the indefinite admittance matrix corresponding to the distributed capacitance $C_{i,j}$ between the node i and the node j can be written as:

$$Y_{i,j} = \begin{cases} y_{i,i} = y_{j,j} = j\omega C_{i,j} \\ y_{i,j} = y_{j,i} = -j\omega C_{i,j}, i = 1, 2, \dots, N; j = 1, 2, \dots, N \\ \text{rest is } 0 \end{cases}$$

where $j=\sqrt{-1}$, $\omega$ is the carrier angular frequency, and N is the number of conductors in the sensitive probe.

In Step 2-3, the indefinite admittance matrices of all distributed capacitances are summed to obtain the N-port indefinite admittance matrix $Y_{N \times N}$ of the sensitive probe.

Further, in Step 3, N conductor electrodes of the sensitive probe are all external nodes with the injection and sensing electrodes respectively connected to the carrier voltage sources and the capacitive displacement sensing circuits, thereby the equivalent circuit model of the sensitive probe connected to the multi-channel capacitive displacement sensing circuits is obtained. The equation I=YV satisfied by the voltages and the currents of the N nodes is directly written from the indefinite admittance matrix, and then the V–I characteristics satisfied by the external termination components of the N nodes are substituted into the above equation to calculated the voltage and the current at each node. The output complex voltage of each capacitive displacement sensing channel can be finally obtained.

Furthermore, in Step 5, an arbitrarily specified time-varying displacement x(t) of the TM in sensitive probe is sampled at a sampling frequency $f_s=M_1 f_0$, where $f_0$ is the highest frequency of the time-varying displacement of the TM, $M_1$ is a value at which a sampling value contains all information of an original signal, and satisfying $M_1 \geq 2$. The total number of sampling points is $M_1 M_2$, where $M_2$ is the number of sampling periods, and each sampling moment $t_m$ is:

$$t_m = \frac{m}{f_s}, m = 0, 1, 2, \dots, M_1 - 1, M_1, M_1 + 1, \dots, M_1 M_2 - 1.$$

Combined with the variation curve of each distributed capacitance versus displacement obtained in Step 4, the value of each distributed capacitance corresponding to displacement of the TM at the sampling moment $t_m$ can be obtained.

Then, the value is applied in the equivalent circuit model established in Step 3 to perform an alternating current steady-state response analysis to compute the output complex voltage $V_{oi}(t_m)$, i=1, 2, . . . , k of each capacitive displacement sensing channel at the sampling moment $t_m$, where k is the number of channels of the capacitive displacement sensing circuits.

Afterwards, the output complex voltages of each channel at all sampling moments are sequentially combined to obtain a time sequence $\dot{V}_{oi}(t)$ of the output complex voltages of each channel:

$$\dot{V}_{oi}(t) = \{V_{oi}(t_0), V_{oi}(t_1), \ldots, V_{oi}(t_{M_1-1}),$$
$$V_{oi}(t_{M_1}), V_{oi}(t_{M_1+1}), \ldots, V_{oi}(t_{M_1M_2-1})\}, i = 1, 2, \ldots, k.$$

Further, in Step 6, the time sequence of the output complex voltage of each channel is combined with the displacement degree of freedom according to the combination rule of displacement degree of freedom. Then, the Fourier transform is performed to obtain the spectrum of the output signals corresponding to each displacement degree of freedom $\dot{V}_X(f)$, $\dot{V}_Y(f)$, $\dot{V}_Z(f)$, $\dot{V}_\varphi(f)$, $\dot{V}_\theta(f)$, and $\dot{V}_\eta(f)$, which respectively correspond to the spectra of the output signals of translational and rotational displacements along X, Y, and Z axes.

Furthermore, in Step 6, when the TM translates along the X-axis direction, the couplings between the X-axis translational displacement degree-of freedom output and other five displacement degree-of freedom outputs can be calculated as follows:

$$\begin{cases} C_{X-Y} = 20\log_{10}\frac{|\dot{V}_Y(f_0)|}{|\dot{V}_X(f_0)|} \\ C_{X-Z} = 20\log_{10}\frac{|\dot{V}_Z(f_0)|}{|\dot{V}_X(f_0)|} \end{cases}$$

$$\begin{cases} C_{X-\varphi} = 20\log_{10}\frac{|\dot{V}_\varphi(f_0)|)}{|\dot{V}_X(f_0)|} \\ C_{X-\theta} = 20\log_{10}\frac{|\dot{V}_\theta(f_0)|}{|\dot{V}_X(f_0)|} \\ C_{X-\eta} = 20\log_{10}\frac{|\dot{V}_\eta(f_0)|}{|\dot{V}_X(f_0)|} \end{cases}$$

where $f_0$ is the highest frequency of a time-varying displacement of the TM, |•| is an amplitude operation of the spectrum, $C_{X-Y}$ and $C_{X-Z}$ respectively are the relative magnitudes of the Y and Z-axes output translational displacements caused by the X-axis translational displacement, $C_{X-\varphi}$, $C_{X-\theta}$, and $C_{X-\eta}$ respectively are the relative magnitudes of the rotational output displacements around the Z, X, and Y-axes caused by the X-axis translational displacement, and $\dot{V}_X(f)$, $\dot{V}_Y(f)$, $\dot{V}_Z(f)$, $\dot{V}_\varphi(f)$, $\dot{V}_\theta(f)$ and $\dot{V}_\eta(f)$ respectively correspond to the spectra of the output signals of translational and rotational displacements along the X, Y, and Z axes.

In the same way, the coupling of each output displacement degree of freedom caused by displacement of the TM along other degrees of freedom can be calculated.

Generally speaking, the above technical solutions conceived by the disclosure have the following beneficial effects compared with the prior art.

(1) In the disclosure, through setting the N(N+1)/2 groups of excitation charges for the N conductors, the electrostatic field distribution under each group of excitation charges is obtained to calculate the electrostatic field energy, thereby the difficulty of calculating the full capacitance matrix of the N conductors can be solved. The above three-dimensional electromagnetic field numerical calculation can be applied to the capacitance extraction of a multi-conductor structure such as the sensitive probe of an inertial sensor in space gravitational wave detection.

(2) In the disclosure, the complete equivalent circuit model for multi-degree-of-freedom coupling analysis can be obtained by establishing the indefinite admittance matrix of the sensitive probe and connecting the subsequent multi-channel sensing circuits, which is a critical technology in the method for multi-degree-of-freedom coupling analysis, and can effectively solve the difficulty of the analysis and calculation during the connection between the multi-port network and the circuit in practical engineering applications.

(3) The disclosure proposes a method for multi-degree-of-freedom coupling calculation, which can be applied to signal processing and analysis scenario in multiple fields, and can effectively solve the degree-of-freedom coupling analysis and calculation of the multi-port network (with coupling elements such as capacitors) in practical engineering applications, which possesses the characteristics of high engineering application value, low computational complexity, and good versatility.

BRIEF DESCRIPTION OF THE DRAWINGS

FIG. 3 is the diagram of an extraction result of a full capacitance matrix of the sensitive probe (N=17) provided by an embodiment of the disclosure.

DESCRIPTION OF THE EMBODIMENTS

In order for the objectives, technical solutions, and advantages to be clearer, the disclosure will be further described in detail below with reference to the drawings and the embodiments. It should be understood that the specific embodiments described here are only used to explain but not intended to limit the disclosure. In addition, the technical features involved in the various embodiments of the disclosure described below can be combined with each other as long as there is no conflict therebetween.

Figure 1:
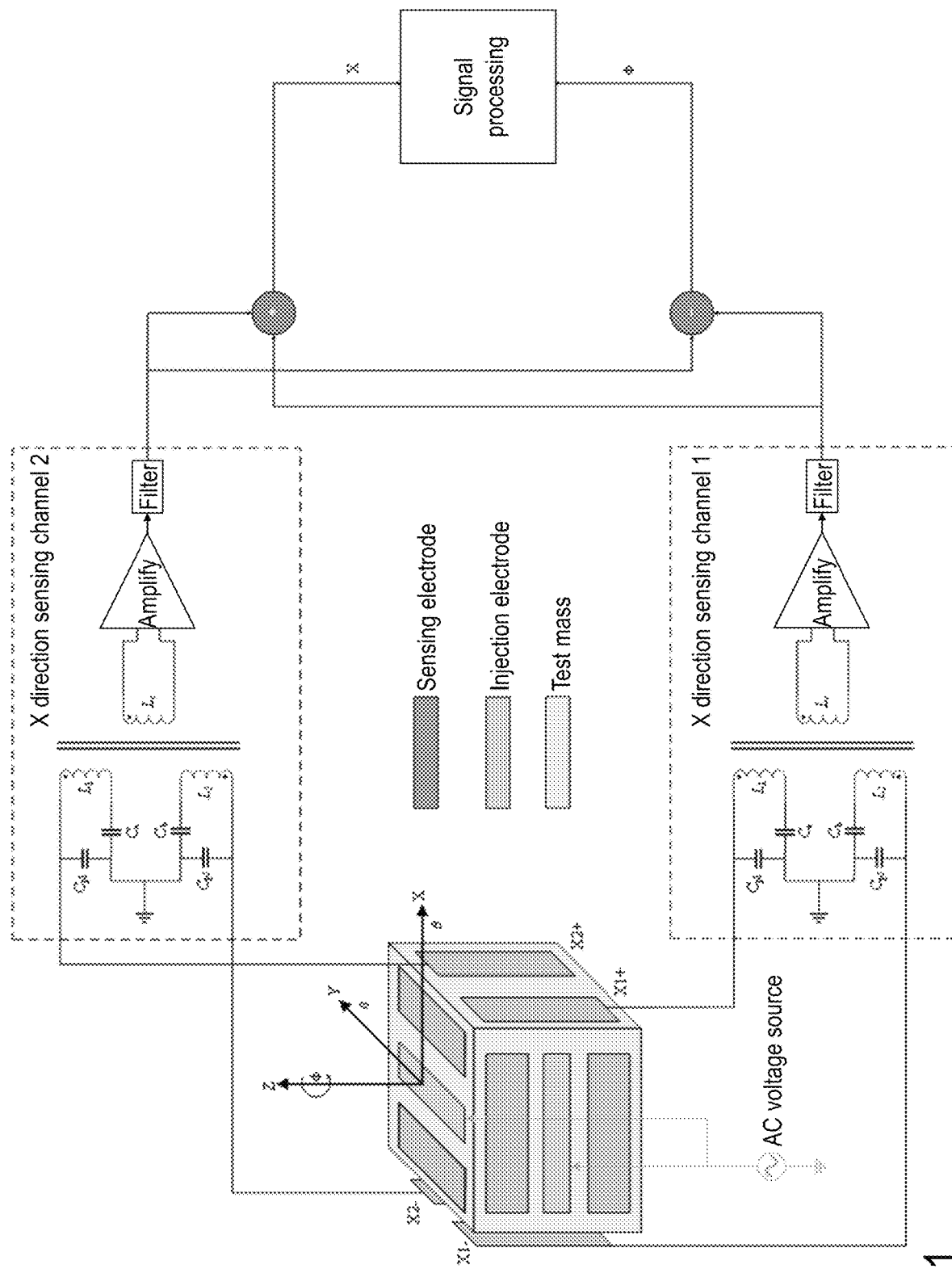
FIG. 1 is the diagram of the X-direction dual-channel capacitive displacement sensing circuits with the sensitive probe (number of conductors N=17) provided by the disclosure.
Figure 2:
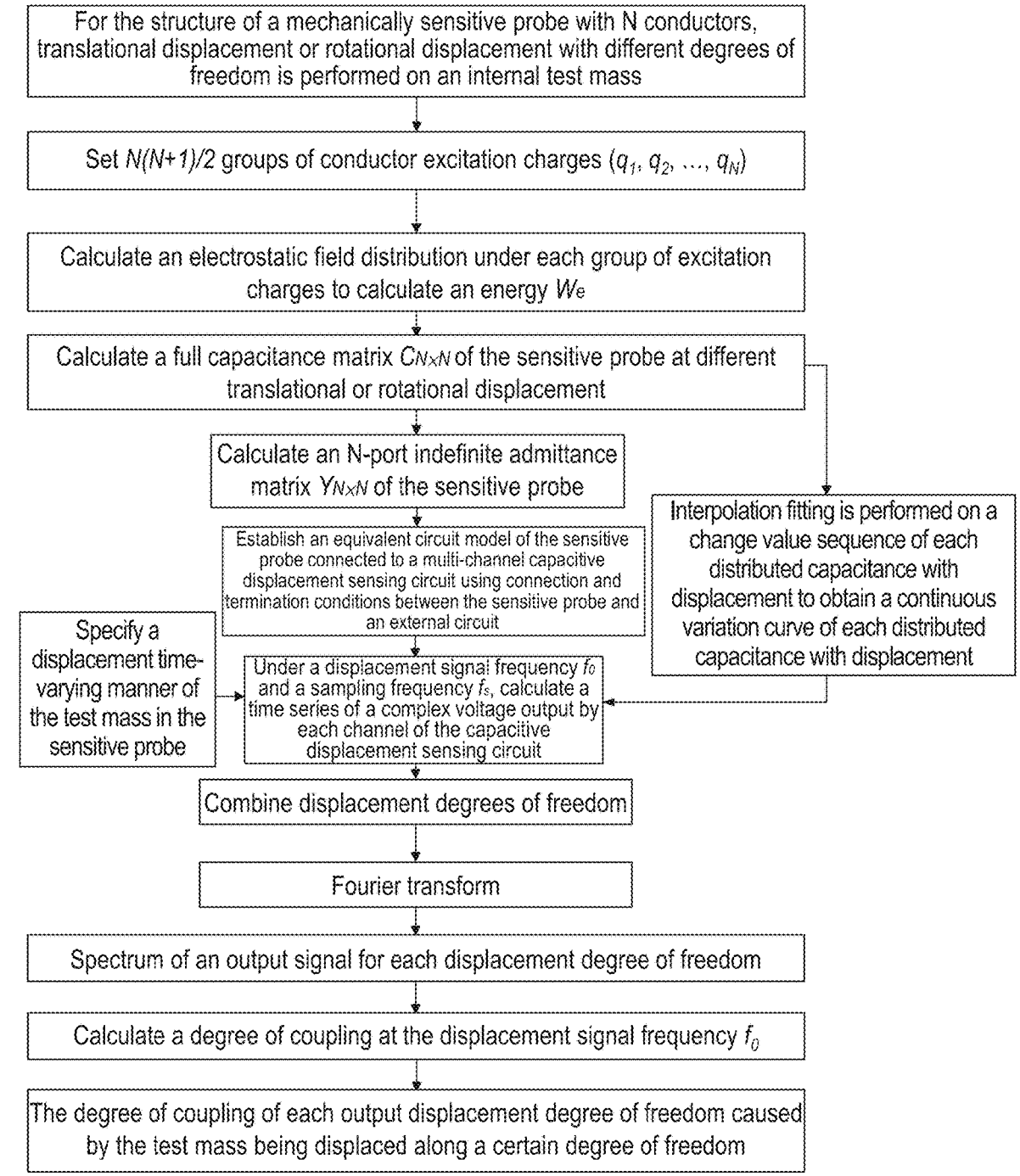
FIG. 2 is the general flowchart of a method for parameter extraction of the sensitive probe and degree-of-freedom coupling calculation of the capacitive displacement sensor provided by the disclosure.

As shown in FIG. 2, the disclosure proposes a method for parameter extraction of a sensitive probe and degree-of-freedom coupling calculation of a capacitive displacement sensor, including the following steps.

In Step 1, translational or rotational displacement with different directions is performed on the TM for a multi-conductor structure (number of conductors N) of the sensitive probe, N(N+1)/2 groups of conductor excitation charges are set, and the three-dimensional electrostatic field distribution function $E^{(k)}$ under each group of excitation charges is obtained to calculate the electrostatic field energy, thereby the full capacitance matrix $C^{N \times N}$ for different translational or rotational displacements is finally obtained.

In Step 2, capacitances among the conductors of the sensitive probe are obtained based on the full capacitance matrix extracted in Step 1 to calculate the N-port indefinite admittance matrix $Y_{N \times N}$ of the sensitive probe.

In Step 3, based on the full capacitance matrix extracted in Step 1, an equivalent circuit model is established in combination with the specific connection of the sensitive probe to k channels of the capacitive displacement sensing circuits. An equation I=YV satisfied by the voltages and the currents of the N nodes is directly written from the indefinite admittance matrix, and then the V–I characteristics satisfied by external termination components of the N nodes are substituted into the above equation to obtain the voltage and the current at each node. Finally, the output complex voltage of each capacitive displacement sensing channel can be obtained.

In Step 4, based on the full capacitance matrix for different translational or rotational displacements extracted in Step 1, the variation value sequence of each distributed capacitance with displacement is interpolated and fitted to obtain the continuous variation curve of each distributed capacitance versus displacement.

In Step 5, a time-varying manner of displacement of the TM in the sensitive probe can be arbitrarily specified, and a value of each distributed capacitance at each displacement moment can be obtained according to the variation curve of each distributed capacitance with displacement obtained in Step 4, which is then applied to calculate the output complex voltage of each capacitive displacement sensing channel in Step 3.

In Step 6, the time sequence of the output complex voltage of each capacitive displacement sensing channel is combined with displacement degrees of freedom, and then the Fourier transform is performed to obtain the spectrum of the output signal of each displacement degree of freedom, thereby the couplings among multi-degree-of-freedom displacements caused by the sensitive probe are finally calculated.

In the disclosure, the channels include two channels in the X, Y and Z-axis directions, respectively. The displacement degrees of freedom include X, Y and Z-axis directions translational and rotational displacement degrees of freedom.

Embodiment

The embodiment takes parameter extraction of a sensitive probe containing 17 conductors and degree-of-freedom coupling calculation of a six-degree-of-freedom capacitive displacement sensor as an example. The specific calculation steps are as follows.

In Step 1, the sensitive probe with the 17 conductors consists of 4 injection electrodes, 12 sensing electrodes, and 1 TM. Translational or rotational displacement with different directions is performed on the TM. And then the 153 groups of conductor excitation charges $(q_1^{(1)}, q_2^{(1)}, \ldots, q_{17}^{(1)})$, $(q_1^{(2)}, q_2^{(2)}, \ldots, q_{17}^{(2)}), \ldots, (q_1^{(153)}, q_2^{(153)}, \ldots, q_{17}^{(153)})$ are set. $Q^{(k)}$ is the k-th group of excitation charges applied to N conductors of the sensitive probe:

$$Q^{(k)} = (q_1^{(k)}, q_2^{(k)}, \ldots, q_n^{(k)}, \ldots q_{17}^{(k)}), k = 1, 2, \ldots, 153$$

where $q_n^{(k)}$ is the charge quantity on the n-th conductor in the k-th group of excitation charges $Q^{(k)}$, the value thereof can be −1 Coulomb, +1 Coulomb, or zero Coulomb, and must satisfy $\Sigma_{n=1}^{17}|q_n^{(k)}|=1$, or satisfy $\Sigma_{n=1}^{17} q_n^{(k)}=0$, $\Sigma_{n=1}^{17}|q_n^{(k)}|=2$, and must satisfy the requirement that excitation charges of different groups are not the same.

The three-dimensional electrostatic field distribution $E^{(k)}$ of the medium region inside the sensitive probe under the k-th group of excitation charges $Q^{(k)}$ is computed by numerical calculation such as the finite difference method. Then, $\alpha_{ij}$ is deduced from the following equation, where i, j=1, 2, ..., 17:

$$\begin{pmatrix} \alpha_{11} \\ \vdots \\ \alpha_{17,17} \\ \alpha_{12} \\ \vdots \\ \alpha_{1,17} \\ \alpha_{23} \\ \vdots \\ \alpha_{2,17} \\ \alpha_{34} \\ \vdots \\ \alpha_{16,17} \end{pmatrix} = \begin{pmatrix} \frac{1}{2}(q_1^{(1)})^2 & \cdots & \frac{1}{2}(q_N^{(1)})^2 & q_1^{(1)}q_2^{(1)} & \cdots & q_1^{(1)}q_N^{(1)} & q_2^{(1)}q_3^{(1)} & \cdots & q_2^{(1)}q_N^{(1)} & q_3^{(1)}q_4^{(1)} & \cdots & q_{N-1}^{(1)}q_N^{(1)} \\ \vdots & \ddots & \vdots & \vdots & \ddots & \vdots & \vdots & \ddots & \vdots & \vdots & \ddots & \vdots \\ \frac{1}{2}(q_1^{(17)})^2 & \cdots & \frac{1}{2}(q_N^{(17)})^2 & q_1^{(17)}q_2^{(17)} & \cdots & q_1^{(17)}q_N^{(17)} & q_2^{(17)}q_3^{(17)} & \cdots & q_2^{(17)}q_N^{(17)} & q_3^{(17)}q_4^{(17)} & \cdots & q_{N-1}^{(17)}q_N^{(17)} \\ \frac{1}{2}(q_1^{(18)})^2 & \cdots & \frac{1}{2}(q_N^{(18)})^2 & q_1^{(18)}q_2^{(18)} & \cdots & q_1^{(18)}q_N^{(18)} & q_2^{(18)}q_3^{(18)} & \cdots & q_2^{(18)}q_N^{(18)} & q_3^{(18)}q_4^{(18} & \cdots & q_{N-1}^{(18)}q_N^{(18)} \\ \vdots & \ddots & \vdots & \vdots & \ddots & \vdots & \vdots & \ddots & \vdots & \vdots & \ddots & \vdots \\ \frac{1}{2}(q_1^{(33)})^2 & \cdots & \frac{1}{2}(q_N^{(33)})^2 & q_1^{(33)}q_2^{(33)} & \cdots & q_1^{(33)}q_N^{(33)} & q_2^{(33)}q_3^{(33)} & \cdots & q_2^{(33)}q_N^{(33)} & q_3^{(33)}q_4^{(33)} & \cdots & q_{N-1}^{(33)}q_N^{(33)} \\ \frac{1}{2}(q_1^{(34)})^2 & \cdots & \frac{1}{2}(q_N^{(34)})^2 & q_1^{(34)}q_2^{(34)} & \cdots & q_1^{(34)}q_N^{(34)} & q_2^{(34)}q_3^{(34)} & \cdots & q_2^{(34)}q_N^{(34)} & q_3^{(34)}q_4^{(34)} & \cdots & q_{N-1}^{(34)}q_N^{(34)} \\ \vdots & \ddots & \vdots & \vdots & \ddots & \vdots & \vdots & \ddots & \vdots & \vdots & \ddots & \vdots \\ \frac{1}{2}(q_1^{(48)})^2 & \cdots & \frac{1}{2}(q_N^{(48)})^2 & q_1^{(48)}q_2^{(48)} & \cdots & q_1^{(48)}q_N^{(48)} & q_2^{(48)}q_3^{(48)} & \cdots & q_2^{(48)}q_N^{(48)} & q_3^{(48)}q_4^{(48)} & \cdots & q_{N-1}^{(48)}q_N^{(48)} \\ \frac{1}{2}(q_1^{(49)})^2 & \cdots & \frac{1}{2}(q_N^{(49)})^2 & q_1^{(49)}q_2^{(49)} & \cdots & q_1^{(49)}q_N^{(49)} & q_2^{(49)}q_3^{(49)} & \cdots & q_2^{(49)}q_N^{(49)} & q_3^{(49)}q_4^{(49)} & \cdots & q_{N-1}^{(49)}q_N^{(49)} \\ \vdots & \ddots & \vdots & \vdots & \ddots & \vdots & \vdots & \ddots & \vdots & \vdots & \ddots & \vdots \\ \frac{1}{2}(q_1^{(153)})^2 & \cdots & \frac{1}{2}(q_N^{(153)})^2 & q_1^{(153)}q_2^{(153)} & \cdots & q_1^{(153)}q_N^{(153)} & q_2^{(153)}q_3^{(153)} & \cdots & q_2^{(153)}q_N^{(153)} & q_3^{(153)}q_4^{(153)} & \cdots & q_{N-1}^{(153)}q_N^{(153)} \end{pmatrix}^{-1} \begin{pmatrix} \int_\tau \frac{1}{2}\varepsilon(E^{(1)})^2 d\tau \\ \vdots \\ \int_\tau \frac{1}{2}\varepsilon(E^{(17)})^2 d\tau \\ \int_\tau \frac{1}{2}\varepsilon(E^{(18)})^2 d\tau \\ \vdots \\ \int_\tau \frac{1}{2}\varepsilon(E^{(33)})^2 d\tau \\ \int_\tau \frac{1}{2}\varepsilon(E^{(34)})^2 d\tau \\ \vdots \\ \int_\tau \frac{1}{2}\varepsilon(E^{(48)})^2 d\tau \\ \int_\tau \frac{1}{2}\varepsilon(E^{(49)})^2 d\tau \\ \vdots \\ \int_\tau \frac{1}{2}\varepsilon(E^{153})^2 d\tau \end{pmatrix}$$

where $\varepsilon$ is the dielectric constant of the filling medium in the sensitive probe and $\int_\tau \frac{1}{2}\varepsilon(E^{(k)})^2 d\tau$ is the calculated electrostatic field energy for the spatial region $\tau$ of the electrostatic field distribution $E^{(k)}$. The symmetric matrix $\alpha$ can be constructed by the calculated $\alpha_{ij}$, and the matrix $\beta$ is deduced from $\beta = \alpha^{-1}$ with the matrix element $\beta_{ij}$, where i, j=1, 2, ..., 17. Then, the distributed mutual capacitance $C_{ij}$ between the i-th conductor and the j-th conductor, and the distributed self-capacitance $C_{ii}$ between the i-th conductor and the outer metal frame (i.e., ground) can be calculated:

$$C_{ij} = -\beta_{ij}, (i \neq j), C_{ij} = \sum_{j=1}^{17} \beta_{ij}$$

Thereby, a symmetrical full capacitance matrix $C_{17 \times 17}$ of the sensitive probe is finally obtained.

Figure 3:
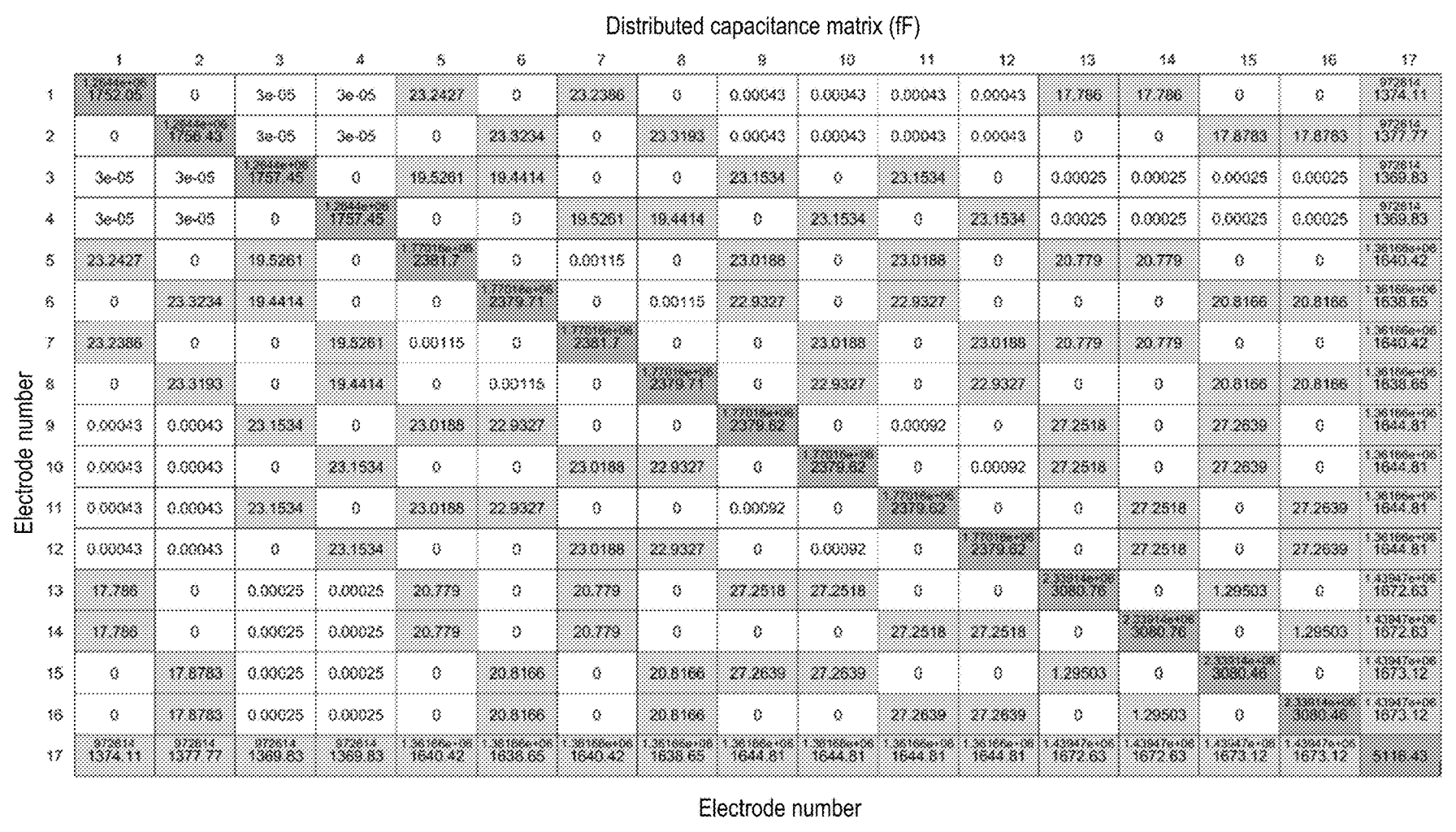

FIG. 3 shows the extracted full capacitance matrix with the TM in the equilibrium position, wherein the leftmost and bottommost rows of numbers in the table represent the numbers of the 17 conductors in the sensitive probe. The dark gray square marks the distributed capacitance between each electrode and the outer metal frame, the light gray square marks the distributed capacitance between adjacent electrodes, and the rest is the distributed capacitance between non-adjacent electrodes. The small characters in the 17-th row, 17-th column, and the squares of the diagonal represent the calculated values according to the mutual capacitance calculation formula of the parallel plate capacitors, which are shown in the figure for reference.

In Step 2, according to the extracted full capacitance matrix $C_{17 \times 17}$, the distributed capacitances among the conductors can be obtained to calculate the 17-port indefinite admittance matrix $Y_{17 \times 17}$ of the sensitive probe. The calculation process is as follows.

1) The 17 conductors in the sensitive probe are sequentially node numbered, and the outer metal frame is applied as a common reference node. Specific node numbers are as follows: 1: front injection electrode ($Y_-$); 2: rear injection electrode ($Y_+$); 3: lower injection electrode ($Z_-$); 4: upper injection electrode ($Z_+$); 5: front sensing electrode 2 ($Z_-$); 6: rear sensing electrode 2 ($Z_-$); 7: front sensing electrode 1 ($Z_+$); 8: rear sensing electrode 1 ($Z_+$); 9: lower sensing electrode 1 ($X_-$); 10: upper sensing electrode 1 ($X_-$); 11: lower sensing electrode 2 ($X_+$); 12: upper sensing electrode 2 ($X_+$); 13: left sensing electrode 2 ($Y_-$); 14: right sensing electrode 2 ($Y_-$); 15: left sensing electrode 1 ($Y_+$); 16: right sensing electrode 1 ($Y_+$); 17: TM.

2) Only the distributed capacitances are included among nodes of the sensitive probe, where the indefinite admittance matrix corresponding to a distributed capacitance $C_{i,j}$ between the node i and the node j can be written as:

$$Y_{i,j} = \begin{cases} y_{i,i} = y_{j,j} = j\omega C_{i,j} \\ y_{i,j} = y_{j,i} = -j\omega C_{i,j} \quad i, j = 1, 2, ..., 17 \\ \text{rest is } 0 \end{cases}$$

where $j = \sqrt{-1}$, $\omega$ is the carrier angular frequency, and the carrier frequency is 100 kHz.

3) The indefinite admittance matrices of all the distributed capacitances $C_{i,j}$ are summed to obtain the 17-port indefinite admittance matrix $Y_{17 \times 17}$ of the sensitive probe.

In Step 3, The 17 conductors of the sensitive probe are all external nodes with 4 injection electrodes and 12 sensing electrodes respectively connected to the carrier voltage sources and the capacitive displacement sensing circuits, thereby the equivalent circuit model of the sensitive probe connected to the six-channel capacitive displacement sensing circuits is obtained. The equation I=YV satisfied by the voltages and the currents of the 17 nodes is directly written from the indefinite admittance matrix, and then the V–I characteristics satisfied by the external termination components of the 17 nodes are substituted into the above equation to calculated the voltage and the current at each node. Finally, the output complex voltage of each capacitive displacement sensing channel is obtained.

Figure 4:
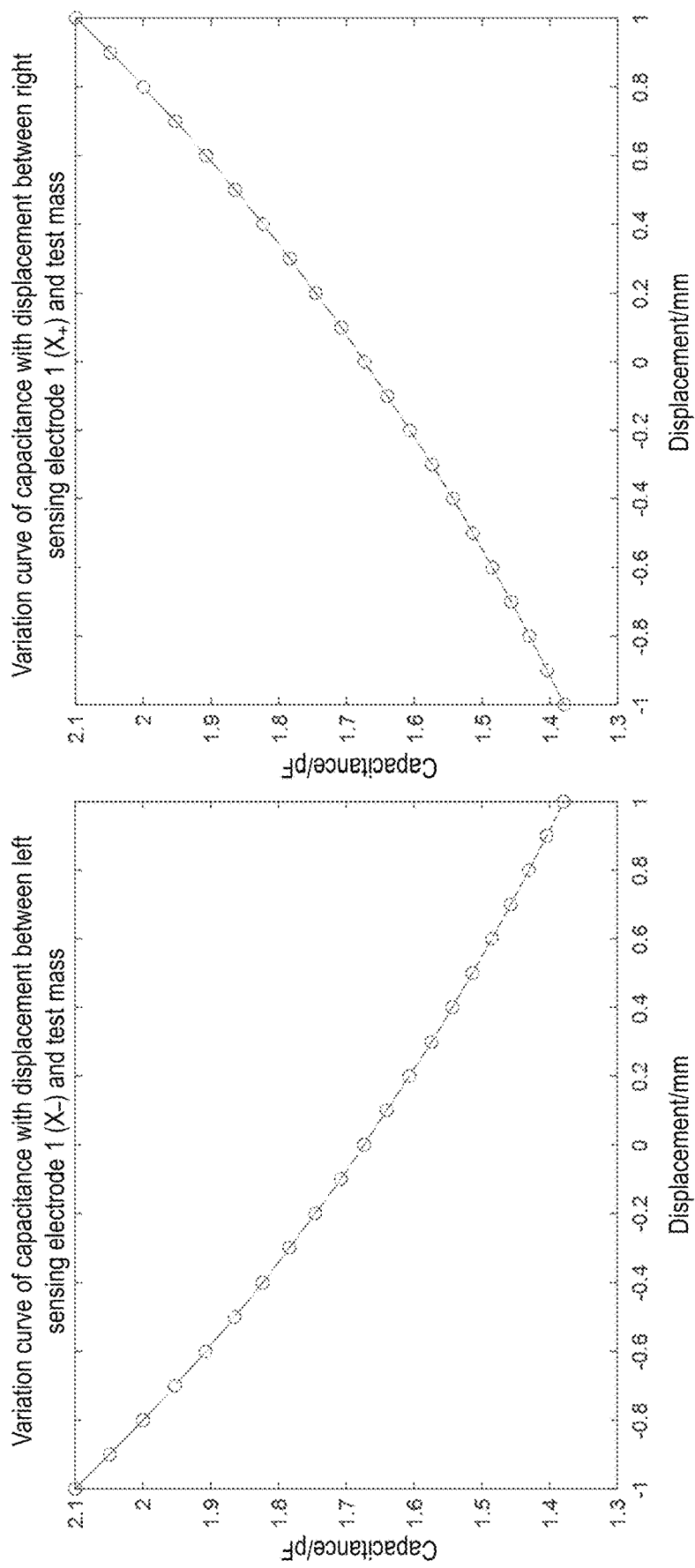
FIG. 4 is the diagram of capacitance versus displacement between a pair of sensing electrodes and the TM in the sensitive probe (number of conductors N=17) when the TM translates [−1, 1] mm along the X-axis direction provided by an embodiment of the disclosure.

In Step 4, based on the full capacitance matrix for different translational or rotational displacements extracted in Step 1, the variation value sequence of each distributed capacitance with displacement is interpolated and fitted to obtain the continuous variation curve of each distributed capacitance with displacement. FIG. 4 shows the variation curve of capacitance versus displacement between a pair of sensing electrodes and the TM when the TM translates [−1, 1] mm along the X-axis direction.

In Step 5, the time-varying displacement of the TM in the sensitive probe is $x(t)=x_m \cos(2\pi f_0 t)$ with the displacement signal frequency $f_0$ 9.765 mHz and the sampling frequency $f_s$ 0.1 Hz, the total number of sampling points m is 1024, and each sampling moment $t_m$ is:

$$t_m = \frac{m}{f_s} \quad (m = 0, 1, 2, \cdots, 1023)$$

Combined with the variation curve of each distributed capacitance versus displacement obtained in Step 4, the value of each distributed capacitance of the sensitive probe corresponding to the displacement of the TM at the sampling moment $t_m$ can be obtained, which is then applied in the equivalent circuit model established in Step 3 to perform an alternating current steady-state response analysis to compute the output complex voltage $V_{oi}(t_m)$, i=1, 2, ..., 6 of each capacitive displacement sensing channel at the sampling moment $t_m$, wherein the number of channels of the capacitive displacement sensing circuits is 6. Then, the output complex voltages of each channel at all sampling moments are sequentially combined to obtain the time sequence $\dot{V}_{oi}(t)$ of the output complex voltages of each channel:

$$\dot{V}_{oi}(t) = \{V_{oi}(t_0), V_{oi}(t_1), \cdots, V_{oi}(t_{1023})\}, \quad i = 1, 2, \cdots, 6.$$

In Step 6, Fourier transform is performed to obtain the spectrum of the output voltage of each channel:

$$\dot{V}_{oi}(f) = FFT\{\dot{V}_{oi}(t)\}, \quad i = 1, 2, \cdots, 6$$

which respectively correspond to the time sequences of the output complex voltages of capacitive displacement sensing channels in the X, Y, and Z-axis directions (the time sequence of the output complex voltages of the two channels in the X direction correspond to $\dot{V}_{o5}(t)$ and $\dot{V}_{o6}(t)$, in the Y direction correspond to $\dot{V}_{o1}(t)$ and $\dot{V}_{o2}(t)$, and in the Z direction correspond to $\dot{V}_{o3}(t)$ and $\dot{V}_{o4}(t)$).

The combination ruler of the displacement degree of freedom in the disclosure includes, but is not limited to, linear combination and polynomial combination. In the embodiment, the linear combination is adopted:

$$\begin{cases} \dot{V}_X(t) = \dot{V}_{o5}(t) + \dot{V}_{o6}(t) \\ \dot{V}_Y(t) = \dot{V}_{o1}(t) + \dot{V}_{o2}(t) \\ \dot{V}_Z(t) = \dot{V}_{o3}(t) + \dot{V}_{o4}(t) \end{cases}, \quad \begin{cases} \dot{V}_\varphi(t) = \dot{V}_{o5}(t) - \dot{V}_{o6}(t) \\ \dot{V}_\theta(t) = \dot{V}_{o1}(t) - \dot{V}_{o2}(t) \\ \dot{V}_\eta(t) = \dot{V}_{o3}(t) - \dot{V}_{o4}(t) \end{cases}$$

Through the Fourier transform, the spectrum of the output signal of each displacement degree of freedom is obtained:

$\dot{V}_x(f), \dot{V}_y(f), \dot{V}_z(f), \dot{V}_\varphi(f), \dot{V}_\theta(f),$ and $\dot{V}_\eta(f)$ Because of the complicated distributed capacitance coupling connection in the sensitive probe, the TM displaces along a certain direction could cause non-zero displacement sensing outputs along the other five displacement degrees of freedom, which is called the output displacement degree-of-freedom couplings. Taking the TM in the sensitive probe that only translates along the X-axis direction as an example, the couplings between the X-axis translational displacement degree-of-freedom output and the other five displacement degree-of-freedom outputs are defined as:

$$\begin{cases} C_{X-Y} = 20\log_{10}\frac{|\dot{V}_Y(f_0)|}{|\dot{V}_X(f_0)|} \\ C_{X-Z} = 20\log_{10}\frac{|\dot{V}_Z(f_0)|}{|\dot{V}_X(f_0)|} \end{cases}$$

It is easy for persons skilled in the art to understand that the above descriptions are only preferred embodiments of the disclosure and are not intended to limit the disclosure. Any modifications, equivalent substitutions, improvements, etc., made within the spirit and principle of the disclosure should be included in the protection scope of the disclosure.

What is claimed is:

1. A method for parameter extraction of a sensitive probe and degree-of-freedom coupling calculation of a capacitive displacement sensor, comprising:
    step 1: performing translational or rotational displacements with different directions on the TM in the sensitive probe with a multi-conductor structure, setting N(N+1)/2 groups of conductor excitation charges, and then calculating the three-dimensional electrostatic field distribution under each group of excitation charges to compute the electrostatic field energy, thereby obtaining the full capacitance matrix for different translational or rotational displacements, where N is the number of conductors in the sensitive probe;
    step 2: obtaining capacitances among the conductors in the sensitive probe based on the full capacitance matrix extracted in step 1 to calculate the N-port indefinite admittance matrix $Y_{N \times N}$ of the sensitive probe;
    step 3: based on the full capacitance matrix extracted in step 1, establishing the equivalent circuit model in combination with a specific connection of the sensitive probe to each capacitive displacement sensing channel, directly writing an equation I=YV satisfied by the voltages and the currents of the N nodes according to the indefinite admittance matrix, and then substituting V–I characteristics satisfied by external termination components of the N nodes into the above equation to obtain the voltage and the current at each node, thereby finally obtaining the output complex voltage of each capacitive displacement sensing channel;
    step 4: based on the full capacitance matrix for different translational or rotational displacements extracted in step 1, performing interpolation fitting on the variation value sequence of each distributed capacitance with displacement to obtain the continuous variation curve of each distributed capacitance versus displacement;
    step 5: arbitrarily specifying a time-varying manner of displacement of the TM in the sensitive probe, and obtaining a value of each distributed capacitance at each displacement moment according to the variation curve of each distributed capacitance versus displacement obtained in step 4, which is then applied to compute the output complex voltage of each capacitive displacement sensing channel in step 3; and
    step 6: combining the time sequence of the output complex voltage of each capacitive displacement sensing channel with displacement degrees of freedom, and then performing Fourier transform to obtain the spectrum of the output signal of each displacement degree of freedom, thereby calculating the couplings among the multi-degree-of-freedom displacements caused by the sensitive probe.

2. The method according to claim 1, wherein in step 1, $Q^{(k)}$ is the k-th group of excitation charges applied to N conductors of the sensitive probe:

$$Q^{(k)} = \left(q_1^{(k)}, q_2^{(k)}, \cdots, q_n^{(k)}, \cdots q_N^{(k)}\right), k = 1, 2, \cdots, N, N+1, \cdots, \frac{N(N+1)}{2}$$

wherein $q_n^{(k)}$ is the charge quantity on the n-th conductor in the k-th group of excitation charges $Q^{(k)}$, the value thereof can be −1 Coulomb, +1 Coulomb, or zero Coulomb, and must satisfy $\Sigma_{n=1}^{N}|q_n^{(k)}|=1$, or satisfy $\Sigma_{n=1}^{N} q_n^{(k)}=0$, $\Sigma_{n=1}^{N}|q_n^{(k)}|=2$, and must satisfy the requirement that excitation charges of different groups are not the same.

3. The method according to claim 1, wherein in step 1, the three-dimensional electrostatic field distribution $E^{(k)}$ of the medium region inside the sensitive probe under the k-th group of excitation charges $Q^{(k)}$ is computed by numerical calculation such as the finite difference method, and then $\alpha_{ij}$ is deduced from the following equation, wherein $\alpha_{ij}$ is the matrix element in the i-th row and the j-th column of an N×N symmetric matrix $\alpha$, where i, j=1, 2, . . . , N:

$$\begin{pmatrix} \alpha_{11} \\ \vdots \\ \alpha_{NN} \\ \alpha_{12} \\ \vdots \\ \alpha_{1N} \\ \alpha_{23} \\ \vdots \\ \alpha_{2N} \\ \alpha_{34} \\ \vdots \\ \alpha_{N-1,N} \end{pmatrix} =$$

-continued $$\begin{Bmatrix} \frac{1}{2}(q_1^{(1)})^2 & \cdots & \frac{1}{2}(q_1^{(1)})^2 & q_1^{(1)}q_2^{(1)} & \cdots & q_1^{(1)}q_N^{(1)} & q_2^{(1)}q_3^{(1)} & \cdots & q_2^{(1)}q_N^{(1)} & q_3^{(1)}q_4^{(1)} & \cdots & q_{N-1}^{(1)}q_{N-1}^{(1)} \\ \vdots & \ddots & \vdots & \vdots & \ddots & \vdots & \vdots & \ddots & \vdots & \vdots & \ddots & \vdots \\ \frac{1}{2}(q_1^{(N)})^2 & \cdots & \frac{1}{2}(q_1^{(N)})^2 & q_1^{(N)}q_2^{(N)} & \cdots & q_1^{(N)}q_N^{(N)} & q_2^{(N)}q_3^{(N)} & \cdots & q_2^{(N)}q_N^{(N)} & q_3^{(N)}q_4^{(N)} & \cdots & q_{N-1}^{(N)}q_{N-1}^{(N)} \\ \frac{1}{2}(q_1^{(N+1)})^2 & \cdots & \frac{1}{2}(q_1^{(N+1)})^2 & q_1^{(N+1)}q_2^{(N+1)} & \cdots & q_1^{(N+1)}q_N^{(N+1)} & q_2^{(N+1)}q_3^{(N+1)} & \cdots & q_2^{(N+1)}q_N^{(N+1)} & q_3^{(N+1)}q_4^{(N+1)} & \cdots & q_{N-1}^{(N+1)}q_{N-1}^{(N+1)} \\ \vdots & \ddots & \vdots & \vdots & \ddots & \vdots & \vdots & \ddots & \vdots & \vdots & \ddots & \vdots \\ \frac{1}{2}(q_1^{(2N-1)})^2 & \cdots & \frac{1}{2}(q_1^{(2N-1)})^2 & q_1^{(2N-1)}q_2^{(2N-1)} & \cdots & q_1^{(2N-1)}q_N^{(2N-1)} & q_2^{(2N-1)}q_3^{(2N-1)} & \cdots & q_2^{(2N-1)}q_N^{(2N-1)} & q_3^{(2N-1)}q_4^{(2N-1)} & \cdots & q_{N-1}^{(2N-1)}q_{N-1}^{(2N-1)} \\ \frac{1}{2}(q_1^{(2N)})^2 & \cdots & \frac{1}{2}(q_1^{(2N)})^2 & q_1^{(2N)}q_2^{(2N)} & \cdots & q_1^{(2N)}q_N^{(2N)} & q_2^{(2N)}q_3^{(2N)} & \cdots & q_2^{(2N)}q_N^{(2N)} & q_3^{(2N)}q_4^{(2N)} & \cdots & q_{N-1}^{(2N)}q_{N-1}^{(2N)} \\ \vdots & \ddots & \vdots & \vdots & \ddots & \vdots & \vdots & \ddots & \vdots & \vdots & \ddots & \vdots \\ \frac{1}{2}(q_1^{(3N-3)})^2 & \cdots & \frac{1}{2}(q_1^{(3N-3)})^2 & q_1^{(3N-3)}q_2^{(3N-3)} & \cdots & q_1^{(3N-3)}q_N^{(3N-3)} & q_2^{(3N-3)}q_3^{(3N-3)} & \cdots & q_2^{(3N-3)}q_N^{(3N-3)} & q_3^{(3N-3)}q_4^{(3N-3)} & \cdots & q_{N-1}^{(3N-3)}q_{N-1}^{(3N-3)} \\ \frac{1}{2}(q_1^{(3N-2)})^2 & \cdots & \frac{1}{2}(q_1^{(3N-2)})^2 & q_1^{(3N-3)}q_2^{(3N-3)} & \cdots & q_1^{(3N-3)}q_N^{(3N-3)} & q_2^{(3N-3)}q_3^{(3N-3)} & \cdots & q_2^{(3N-3)}q_N^{(3N-3)} & q_3^{(3N-3)}q_4^{(3N-3)} & \cdots & q_{N-1}^{(3N-3)}q_{N-1}^{(3N-3)} \\ \vdots & \ddots & \vdots & \vdots & \ddots & \vdots & \vdots & \ddots & \vdots & \vdots & \ddots & \vdots \\ \frac{1}{2}\left(q_1^{\left(\frac{N(N+1)}{2}\right)}\right)^2 & \cdots & \frac{1}{2}\left(q_1^{\left(\frac{N(N+1)}{2}\right)}\right)^2 & q_1^{\left(\frac{N(N+1)}{2}\right)} & \cdots & q_1^{\left(\frac{N(N+1)}{2}\right)} & q_2^{\left(\frac{N(N+1)}{2}\right)} & \cdots & q_2^{\left(\frac{N(N+1)}{2}\right)} & q_3^{\left(\frac{N(N+1)}{2}\right)} & \cdots & q_{N-1}^{\left(\frac{N(N+1)}{2}\right)} \\ & & & q_2^{\left(\frac{N(N+1)}{2}\right)} & & q_N^{\left(\frac{N(N+1)}{2}\right)} & q_3^{\left(\frac{N(N+1)}{2}\right)} & & q_N^{\left(\frac{N(N+1)}{2}\right)} & q_4^{\left(\frac{N(N+1)}{2}\right)} & & q_N^{\left(\frac{N(N+1)}{2}\right)} \end{Bmatrix}^{-1}$$

$$\begin{Bmatrix} \int_\tau \frac{1}{2}\varepsilon(E^{(1)})^2 d\tau \\ \vdots \\ \int_\tau \frac{1}{2}\varepsilon(E^{(N)})^2 d\tau \\ \int_\tau \frac{1}{2}\varepsilon(E^{(N+1)})^2 d\tau \\ \vdots \\ \int_\tau \frac{1}{2}\varepsilon(E^{(2N-1)})^2 d\tau \\ \int_\tau \frac{1}{2}\varepsilon(E^{(2N)})^2 d\tau \\ \vdots \\ \int_\tau \frac{1}{2}\varepsilon(E^{(3N-3)})^2 d\tau \\ \int_\tau \frac{1}{2}\varepsilon(E^{(3N-2)})^2 d\tau \\ \vdots \\ \int_\tau \frac{1}{2}\varepsilon\left(E^{\left(\frac{N(N+1)}{2}\right)}\right)^2 d\tau \end{Bmatrix}$$

wherein $\varepsilon$ is the dielectric constant of the filling medium in the sensitive probe and $$\int_\tau \frac{1}{2}\varepsilon(E^{(k)})^2 d\tau$$

is the calculated electrostatic field energy for the spatial region $\tau$ of the electrostatic field distribution $E^{(k)}$ in the sensitive probe, and the symmetric matrix $\alpha$ is constructed by the calculated $\alpha_{ij}$;

$\beta$ is then deduced from $\beta = \alpha^{-1}$ with the matrix element $\beta_{ij}$, where i, j=1, 2, . . . , N;

the distributed mutual capacitance $C_{ij}$ between the i-th conductor and the j-th conductor, and the distributed self-capacitance $C_{ii}$ between the i-th conductor and the outer metal frame (i.e., ground) can be calculated:

$$C_{ij} = -\beta_{ij}, (i \neq j)$$

$$C_{ii} = \sum_{j=1}^{N} \beta_{ij}$$

a symmetrical full capacitance matrix $C_{N \times N}$ of the sensitive probe is finally obtained.

4. The method according to claim 1, wherein in step 2, an N-port indefinite admittance matrix $Y_{N \times N}$ of the sensitive probe is calculated as follows:

step 2-1: sequentially node numbering the N conductors of the sensitive probe, and applying the outer metal frame as a common node;

step 2-2: calculating the indefinite admittance matrices for distributed capacitances among the conductors of the sensitive probe according to the extracted full capacitance matrix, wherein the indefinite admittance matrix corresponding to the distributed capacitance $C_{i,j}$ between the node i and the node j can be written as:

$$Y_{i,j} = \begin{cases} y_{i,i} = y_{j,j} = j\omega C_{i,j} \\ y_{i,j} = y_{j,i} = -j\omega C_{i,j} & i, j = 1, 2, \ldots, N; j = 1, 2, \cdots, N \\ \text{rest is } 0 \end{cases}$$

wherein $j = \sqrt{-1}$, $\omega$ is the carrier angular frequency, and N is the number of conductors in the sensitive probe;

step 2-3: summing indefinite admittance matrices of all distributed capacitances to obtain the N-port indefinite admittance matrix $Y_{N \times N}$ of the sensitive probe.

5. The method according to claim 1, wherein in step 3, N conductor electrodes of the sensitive probe are all external nodes with the injection electrodes and the sensing electrodes of the sensitive probe respectively connected to the carrier voltage sources and the capacitive displacement sensing circuits, the equivalent circuit model of the sensitive probe connected to the multi-channel capacitive displacement sensing circuits is obtained; the equation I=YV satisfied by the voltages and the currents of the N nodes is directly written from the indefinite admittance matrix, thereby substituting the V–I characteristics satisfied by the external termination components of the N nodes into the above equation to obtain the voltage and the current at each node, and the output complex voltage of each capacitive displacement sensing channel is finally obtained.

6. The method according to claim 1, wherein in step 5, an arbitrarily specified time-varying displacement x(t) of the TM in sensitive probe is sampled at a sampling frequency $f_s = M_1 f_0$, where $f_0$ is the highest frequency of the time-varying displacement of the TM, $M_1$ is a value at which a sampling value contains all information of an original signal, and $M_1 \geq 2$, wherein the total number of sampling points is $M_1 M_2$, where $M_2$ is the number of sampling periods, and each sampling moment $t_m$ is:

$$t_m = \frac{m}{f_s}, m = 0, 1, 2, \cdots, M_1 - 1, M_1, M_1 + 1, \cdots, M_1 M_2 - 1$$

combined with the variation curve of each distributed capacitance versus displacement obtained in step 4, the value of each distributed capacitance corresponding to displacement of the TM at the sampling moment $t_m$ can be obtained;

the value is then applied in the equivalent circuit model established in step 3 to perform an alternating current steady-state response analysis to calculate the output complex voltage $V_{oi}(t_m)$, i=1, 2, . . . , k of each capacitive displacement sensing channel at the sampling moment $t_m$, where k is the number of channels of the capacitive displacement sensing circuits;

the output complex voltages of each channel at all sampling moments are then sequentially combined to obtain a time sequence $\dot{V}_{oi}(t)$ of the output complex voltages of each channel:

$$\dot{V}_{oi}(t) = \{V_{oi}(t_0), V_{oi}(t_1), \cdots, V_{oi}(t_{M_1-1}),$$
$$V_{oi}(t_{M_1}), V_{oi}(t_{M_1+1}), \cdots, V_{oi}(t_{M_1 M_2 -1})\}, i = 1, 2, \cdots, k.$$

7. The method according to claim 1, wherein in step 6, the time sequence of the output complex voltage of each channel is combined with the displacement degree of freedom according to the combination rule of displacement degree of freedom; the Fourier transform is then performed to obtain the spectrum of the output signal corresponding to each displacement degree of freedom $\dot{V}_X(f)$, $\dot{V}_Y(f)$, $\dot{V}_Z(f)$, $\dot{V}_\varphi(f)$, $\dot{V}_\theta(f)$, and $\dot{V}_\eta(f)$, which respectively correspond to the spectra of the output signals of translational and rotational displacements along X, Y, and Z axes.

8. The method according to claim 1, wherein in step 6, when the TM in the sensitive probe only translates along the X-axis direction, the couplings between the X-axis translational displacement degree-of-freedom output and other five displacement degree-of-freedom outputs are calculated as follows:

$$\begin{cases} C_{X-Y} = 20 \log_{10} \frac{|\dot{V}_Y(f_0)|}{|\dot{V}_X(f_0)|} \\ C_{X-Z} = 20 \log_{10} \frac{|\dot{V}_Z(f_0)|}{|\dot{V}_X(f_0)|} \end{cases}$$

$$\begin{cases} C_{X-\varphi} = 20 \log_{10} \frac{|\dot{V}_\varphi(f_0)|}{|\dot{V}_X(f_0)|} \\ C_{X-\theta} = 20 \log_{10} \frac{|\dot{V}_\theta(f_0)|}{|\dot{V}_X(f_0)|} \\ C_{X-\eta} = 20 \log_{10} \frac{|\dot{V}_\eta(f_0)|}{|\dot{V}_X(f_0)|} \end{cases}$$

wherein $f_0$ is the highest frequency of a time-varying displacement of the TM, |•| is an amplitude operation of the spectrum, $C_{X-Y}$ and $C_{X-Z}$ respectively are the relative magnitudes of the Y and Z-axis output translational displacements caused by the X-axis translational displacement, $C_{X-\varphi}$, $C_{X-\theta}$, and $C_{X-\eta}$ respectively are the relative magnitudes of the rotational output displacements around the Z, X, and Y-axes caused by the X-axis translational displacement, and $\dot{V}_X(f)$, $\dot{V}_Y(f)$, $\dot{V}_Z(f)$, $\dot{V}_\varphi(f)$, $\dot{V}_\theta(f)$, and $\dot{V}_\eta(f)$ respectively correspond to the spectra of the output signals of translational and rotational displacements along the X, Y, and Z axes;

the coupling of each output displacement degree of freedom caused by displacement of the TM along other degrees of freedom can be calculated in the same way.

* * * * *